US012661680B2

(12) United States Patent
Yan et al.

(10) Patent No.: US 12,661,680 B2
(45) Date of Patent: Jun. 23, 2026

(54) FLOW-COATING APPARATUS AND FLOW-COATING METHOD

(71) Applicant: CONTEMPORARY AMPEREX TECHNOLOGY (HONG KONG) LIMITED, Hong Kong (CN)

(72) Inventors: Zunguang Yan, Ningde (CN); Ye Xu, Ningde (CN); Fenggui Zeng, Ningde (CN); Jiajing Gao, Ningde (CN); Renyu Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/620,821

(22) Filed: Mar. 28, 2024

(65) Prior Publication Data

US 2024/0238826 A1     Jul. 18, 2024

Related U.S. Application Data

(63) Continuation of application No. PCT/CN2022/142531, filed on Dec. 27, 2022.

(30) Foreign Application Priority Data

Jan. 12, 2022     (CN) .......................... 202210033462.8

(51) Int. Cl.
B05C 5/02          (2006.01)
B05C 11/10          (2006.01)
(Continued)

(52) U.S. Cl.
CPC ............ B05C 5/02 (2013.01); B05C 11/1039 (2013.01); B05C 11/1044 (2013.01); B05C 13/02 (2013.01); H01M 50/1245 (2021.01)

(58) Field of Classification Search
None
See application file for complete search history.

(56) References Cited

U.S. PATENT DOCUMENTS 5,296,029 A      3/1994   Neikter
8,535,763 B2 *   9/2013   Inoue ........................ B05D 1/40
                                                  264/129
(Continued)

FOREIGN PATENT DOCUMENTS

CN          102806168 A     12/2012
CN          102061135 B     7/2014
(Continued)

OTHER PUBLICATIONS

China National Intellectual Property Administration (CNIPA) Office Action 1 for Application No. 202210033462.8 Apr. 30, 2025 15 Pages (including translation).

(Continued)

*Primary Examiner* — Jethro M. Pence
(74) *Attorney, Agent, or Firm* — ANOVA LAW GROUP, PLLC

(57)                    ABSTRACT

A flow-coating apparatus is configured to flow-coat a member to be flow-coated with an insulation layer, where the member to be flow-coated includes a first surface and an outer peripheral surface surrounding a periphery of the first surface, the first surface being perpendicular to a vertical direction. The flow-coating apparatus includes a first flow-coating mechanism and a second flow-coating mechanism, where a flow-coating opening of the first flow-coating mechanism faces the first surface and is configured to flow-coat the first surface with the insulation layer; and a flow-coating opening of the second flow-coating mechanism
(Continued)

faces the outer peripheral surface and is configured to flow-coat the outer peripheral surface with the insulation layer.

15 Claims, 7 Drawing Sheets

(51) Int. Cl.
  B05C 13/02           (2006.01)
  H01M 50/124          (2021.01)

(56)                    References Cited

U.S. PATENT DOCUMENTS

| | | | | |
|---|---|---|---|---|
| 9,138,765 | B2 * | 9/2015 | Greisner | B05B 13/0207 |
| 9,289,791 | B2 * | 3/2016 | Uematsu | B05C 5/0216 |
| 10,214,926 | B2 * | 2/2019 | Lim | B25J 11/0085 |
| 10,350,626 | B2 * | 7/2019 | Covizzi | B01D 46/0006 |
| 10,350,627 | B2 * | 7/2019 | Covizzi | B05B 14/43 |
| 10,981,128 | B2 * | 4/2021 | Lewis | B05C 9/14 |
| 11,084,058 | B2 * | 8/2021 | de Borchgrave | B01D 47/025 |
| 11,110,475 | B2 * | 9/2021 | Hegeman | B05B 9/0423 |
| 11,148,161 | B2 * | 10/2021 | Ferguson | B05C 5/02 |
| 11,154,893 | B1 * | 10/2021 | Matern | B05C 9/04 |
| 11,219,916 | B2 * | 1/2022 | Shiwa | B05B 15/70 |
| 11,607,702 | B2 * | 3/2023 | Ferguson | B05B 9/0423 |
| 11,633,752 | B2 * | 4/2023 | de Borchgrave | B05B 14/468 |
| | | | | 118/326 |
| 11,660,632 | B2 * | 5/2023 | Bertola | B05C 11/1039 |
| | | | | 118/300 |
| 11,679,408 | B2 * | 6/2023 | Landa | B41M 3/00 |
| | | | | 118/200 |
| 11,813,637 | B1 * | 11/2023 | Petras | B25H 1/16 |
| 11,819,870 | B2 * | 11/2023 | Harrison | B05B 9/01 |
| 11,872,579 | B1 * | 1/2024 | Hegeman | B05B 12/002 |
| 11,872,686 | B2 * | 1/2024 | Konno | B25J 9/0084 |
| 11,878,316 | B2 * | 1/2024 | de Borchgrave | B01D 46/0006 |
| 12,030,075 | B2 * | 7/2024 | Ferguson | B05C 5/02 |
| 12,269,623 | B2 * | 4/2025 | Rodrigues | B05C 5/02 |
| 2018/0015499 | A1 | 1/2018 | Kim et al. | |
| 2018/0221904 | A1 * | 8/2018 | Yoshino | B25J 9/042 |
| 2020/0023401 | A1 | 1/2020 | Pickworth | |
| 2024/0024913 | A1 * | 1/2024 | Fukutomi | B05C 9/04 |

FOREIGN PATENT DOCUMENTS

| | | | | |
|---|---|---|---|---|
| CN | 106733462 | A | 5/2017 | |
| CN | 107899827 | A | 4/2018 | |
| CN | 110665684 | A | 1/2020 | |
| CN | 210753363 | U | 6/2020 | |
| CN | 111451049 | A | 7/2020 | |
| CN | 211964742 | U | 11/2020 | |
| CN | 212441749 | U | 2/2021 | |
| CN | 112536176 | A | 3/2021 | |
| CN | 113351428 | A | 9/2021 | |
| CN | 113318876 | B | 10/2021 | |
| CN | 215313452 | U * | 12/2021 | B05B 13/02 |
| DE | 102019001423 | A1 | 8/2020 | |
| JP | S5946168 | A | 3/1984 | |

OTHER PUBLICATIONS

China National Intellectual Property Administration (CNIPA) Office Action 2 for Application No. 202210033462.8 Jun. 6, 2025 15 Pages (including translation).
Sining Yun, "New Energy Materials and Devices", May 31, 2019, p. 273-274, China Building Materials Industry Press, China.
The World Intellectual Property Organization (WIPO) International Search Report for PCT/CN2022/142531 Mar. 25, 2023 6 Pages (including translation).
The European Patent Office (EPO) The Extended European Search Report for Application No. 22920070.4 Dec. 12, 2024 7 Pages.
The European Patent Office (EPO) Communication pursuant to Article 94(3) EPC for Application No. 22920070.4 Nov. 19, 2025 64 pages.

* cited by examiner

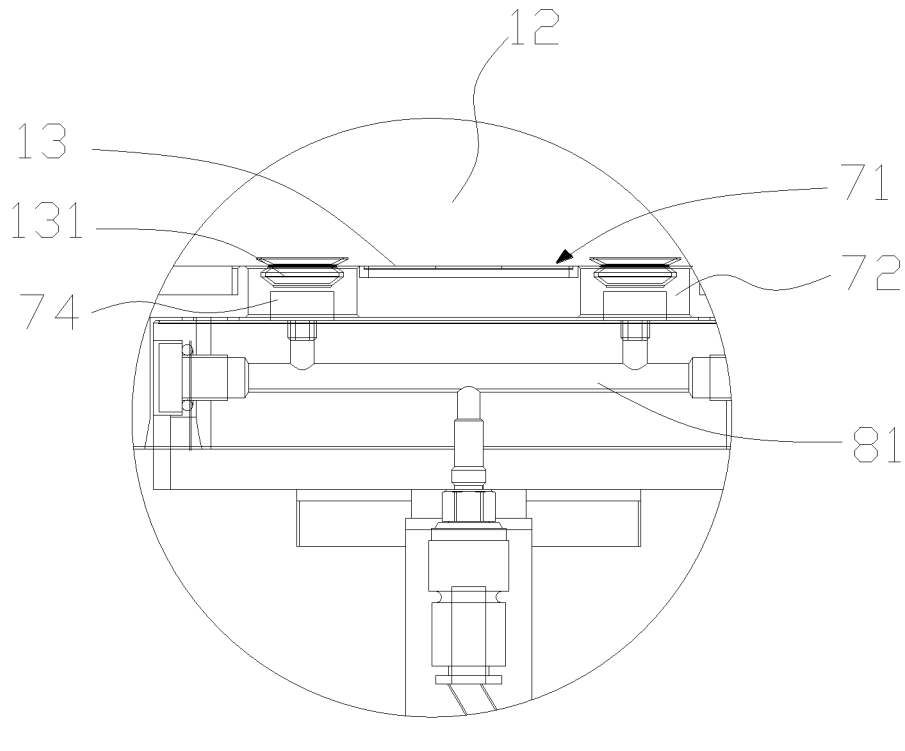

FIG. 8

| | |
|---|---|
| Provide a first flow-coating mechanism and a second flow-coating mechanism, where a flow-coating opening of the first flow-coating mechanism faces a first surface, and a flow-coating opening of the second flow-coating mechanism faces an outer peripheral surface | S100 |
| Perform flow-coating on the first surface and the outer peripheral surface using the first flow-coating mechanism and the second flow-coating mechanism | S110 |
| Perform drying on a flow-coated device, where drying conditions are 40°C to 100°C and 1 min to 15 min | S120 |

FIG. 9

FLOW-COATING APPARATUS AND FLOW-COATING METHOD

CROSS-REFERENCE TO RELATED APPLICATIONS

This application is a continuation of International Application No. PCT/CN2022/142531, filed on Dec. 27, 2022, which claims priority to Chinese Patent Application No. 202210033462.8, filed on Jan. 12, 2022 and entitled "FLOW-COATING APPARATUS AND FLOW-COATING METHOD", the entire contents of which are incorporated herein by reference.

TECHNICAL FIELD

This application relates to the field of surface spray coating, and in particular, to a flow-coating apparatus and a flow-coating method.

BACKGROUND

Energy saving and emission reduction are crucial to the sustainable development of the automobile industry. Electric vehicles, with their advantages in energy conservation and emission reduction, have become an important part of sustainable development of the automobile industry. For electric vehicles, battery technology is an important factor in connection with their development. During battery production, film needs to be applied on the battery. However, shear strength of the film material applied on the battery housing is relatively low.

SUMMARY

In view of the foregoing problem, this application provides a flow-coating apparatus and a flow-coating method, to perform even flow-coating on a first surface and an outer peripheral surface of a member to be flow-coated.

According to a first aspect, an embodiment of this application provides a flow-coating apparatus, configured to flow-coat a member to be flow-coated with an insulation layer, where the member to be flow-coated includes a first surface and an outer peripheral surface surrounding a periphery of the first surface, the first surface being perpendicular to a vertical direction, and the flow-coating apparatus includes a first flow-coating mechanism and a second flow-coating mechanism, where a flow-coating opening of the first flow-coating mechanism faces the first surface and is configured to flow-coat the first surface with the insulation layer; and a flow-coating opening of the second flow-coating mechanism faces the outer peripheral surface and is configured to flow-coat the outer peripheral surface with the insulation layer.

The first flow-coating mechanism and second flow-coating mechanism in the embodiments of this application respectively perform flow-coating on the first surface and the outer peripheral surface of the member to be flow-coated, to ensure that the first surface and the outer peripheral surface are evenly flow-coated with the flow-coating material, thus ensuring even and reliable distribution of the insulation layer on the first surface and outer peripheral surface of the member to be flow-coated.

In some embodiments, the outer peripheral surface includes multiple pairs of side surfaces disposed opposite each other, and the second flow-coating mechanism includes multiple flow-coating assemblies, where the multiple flow-coating assemblies are configured to flow-coat the multiple pairs of side surfaces, respectively.

In the embodiments of this application, the multiple flow-coating assemblies are configured to flow-coat the multiple pairs of side surfaces, respectively, so as to ensure that each pair of side surfaces of the member to be flow-coated are flow-coated with the insulation layer, thereby improving reliability of the outer surface of the member to be flow-coated.

In some embodiments, each side surface in at least one pair of side surfaces is correspondingly provided with the flow-coating assembly.

In the embodiments of this application, each side surface in at least one pair of side surfaces is provided with the flow-coating assembly correspondingly. With such design, two side surfaces disposed opposite each other can be flow-coated at the same time during flow-coating, thereby improving flow-coating efficiency.

In some embodiments, at least one side surface is correspondingly provided with multiple flow-coating assemblies.

In the embodiments of this application, the multiple flow-coating assemblies perform flow-coating on one side surface, so that each zone of the single side surface can have a structurally uniform insulation layer formed, further improving flow-coating reliability of the flow-coating apparatus.

In some embodiments, the flow-coating apparatus further includes a delivery mechanism configured to deliver multiple members to be flow-coated along a delivery direction, where the multiple flow-coating assemblies are spaced apart along the delivery direction, and the multiple flow-coating assemblies are disposed corresponding to the multiple members to be flow-coated, respectively.

The flow-coating apparatus provided in the embodiments of this application can perform flow-coating on multiple members to be flow-coated at the same time through cooperation between the delivery mechanism and the multiple flow-coating assemblies, further improving flow-coating efficiency of the flow-coating apparatus.

In some embodiments, the flow-coating apparatus further includes a rotation mechanism configured to drive rotation of the member to be flow-coated, to allow the second flow-coating mechanism to perform flow-coating on different zones of the outer peripheral surface of the member to be flow-coated.

In the embodiments of this application, the rotation mechanism drives the member to be flow-coated to rotate, so that the flow-coating opening of one flow-coating assembly can point to different zones of the outer peripheral surface of the member to be flow-coated. In other words, one flow-coating assembly can perform flow-coating on different zones of the outer peripheral surface of the member to be flow-coated, reducing the number of flow-coating assemblies in the second flow-coating mechanism, and lowering manufacture costs.

In some embodiments, the flow-coating apparatus further includes a recycling groove, where the recycling groove is located under the member to be flow-coated in the vertical direction.

In the embodiments of this application, the flow-coating apparatus is provided with the recycling groove for recycling dripping flow-coating material, so as to achieve reuse and reduce waste. In addition, the flow-coating material can be prevented from dripping onto the delivery mechanism and the rotation mechanism, ensuring their long-term use.

In some embodiments, the flow-coating apparatus further includes a liquid supply mechanism, where at least one of the first flow-coating mechanism and the second flow-coating mechanism communicates with the recycling groove via the liquid supply mechanism.

The recycling groove in the embodiments of this application communicates with the first flow-coating mechanism and the second flow-coating mechanism via the liquid supply mechanism, so that the flow-coating material can be recycled through manual or automatic control. This improves working efficiency of the flow-coating apparatus while improving utilization of the flow-coating material.

In some embodiments, the flow-coating apparatus further includes a bearing boss, where the bearing boss includes a bearing surface and a positioning groove formed by the bearing surface being recessed inwards, the member to be flow-coated being placed on the bearing boss via the positioning groove.

In the embodiments of this application, the positioning groove is provided on the bearing surface, to implement positioning of the member to be flow-coated on the bearing boss, so as to prevent the member to be flow-coated from leaving the bearing boss under stress during the flow-coating process, thereby ensuring overall structural reliability of the flow-coating apparatus.

In some embodiments, the flow-coating apparatus further includes a gas suction mechanism, and the bearing boss includes a gas channel communicating with the gas suction mechanism, where the gas channel includes a gas orifice provided on the bearing surface, and the gas suction mechanism attracts the member to be flow-coated onto the bearing surface via the gas orifice.

In the embodiments of this application, fixed connection between the member to be flow-coated and the bearing boss is implemented via the gas suction mechanism, which further improves connection reliability between the bearing boss and the member to be flow-coated, preventing the member to be flow-coated from leaving the bearing boss under external forces. In addition, the gas suction mechanism needs no direct contact with the member to be flow-coated, preventing scratches on the outer surface of the member to be flow-coated.

In some embodiments, the member to be flow-coated is a battery cell, where the battery cell includes a housing and a top cover plate. The top cover plate is disposed at one side of the housing and covers an opening of the housing, and the housing includes a bottom wall opposite the top cover plate and a side wall surrounding a periphery of the bottom wall, where a side of the bottom wall facing away from the top cover plate is the first surface, and a side of the side wall facing away from the opening is the outer peripheral surface.

In the embodiments of this application, the top cover plate is fixedly connected to the bearing boss, and flow-coating is performed on the bottom wall. In other words, the battery cell is fastened upside down on the bearing boss for flow-coating. With such design, the electrode terminal in the battery cell can be prevented from being polluted by the flow-coating material, improving production yield of battery cells.

According to a second aspect, an embodiment of this application provides a flow-coating method used for flow-coating a member to be flow-coated, where the member to be flow-coated includes a first surface and an outer peripheral surface surrounding a periphery of the first surface, the first surface being perpendicular to a vertical direction, and the flow-coating method includes:

providing a first flow-coating mechanism and a second flow-coating mechanism, where a flow-coating opening of the first flow-coating mechanism faces the first surface, and a flow-coating opening of the second flow-coating mechanism faces the outer peripheral surface; and performing flow-coating on the first surface and the outer peripheral surface using the first flow-coating mechanism and the second flow-coating mechanism.

In some embodiments, in the step of performing flow-coating on the first surface and the outer peripheral surface using the first flow-coating mechanism and the second flow-coating mechanism, the first flow-coating mechanism and the second flow-coating mechanism perform flow-coating on the first surface and the outer peripheral surface at the same time.

In some embodiments, the second flow-coating mechanism includes multiple flow-coating assemblies spaced apart, and the step of performing flow-coating on the first surface and the outer peripheral surface using the first flow-coating mechanism and the second flow-coating mechanism includes:

using a delivery mechanism to drive multiple members to be flow-coated to move along a delivery direction; and performing, by the multiple flow-coating assemblies, flow-coating on the outer peripheral surfaces of the multiple members to be flow-coated, respectively.

In some embodiments, the step of performing flow-coating on the first surface and the outer peripheral surface using the first flow-coating mechanism and the second flow-coating mechanism includes:

using a rotation mechanism to drive rotation of the member to be flow-coated, to allow the second flow-coating mechanism to perform flow-coating on different zones of the outer peripheral surface of the member to be flow-coated.

In some embodiments, the flow-coating method further includes:

performing drying on a flow-coated device, where a drying temperature is 40° C. to 100° C., and a drying time is 1 min to 15 min.

The foregoing description is merely an overview of the technical solution of this application. For a better understanding of the technical means in this application such that they can be implemented according to the content of the specification, and to make the above and other objectives, features, and advantages of this application more obvious and easier to understand, the following describes specific embodiments of this application.

BRIEF DESCRIPTION OF DRAWINGS

To describe the technical solutions of the embodiments of this application more clearly, the following briefly describes the accompanying drawings required for describing the embodiments of this application. Apparently, the accompanying drawings described below show merely some embodiments of this application, and persons of ordinary skill in the art may still derive other drawings from the accompanying drawings without creative efforts.

FIG. 8 is an enlarged view of zone Q in FIG. 7;

FIG. 9 is a flowchart of a flow-coating method according to an embodiment of this application.

In the accompanying drawings:

Figure 1:
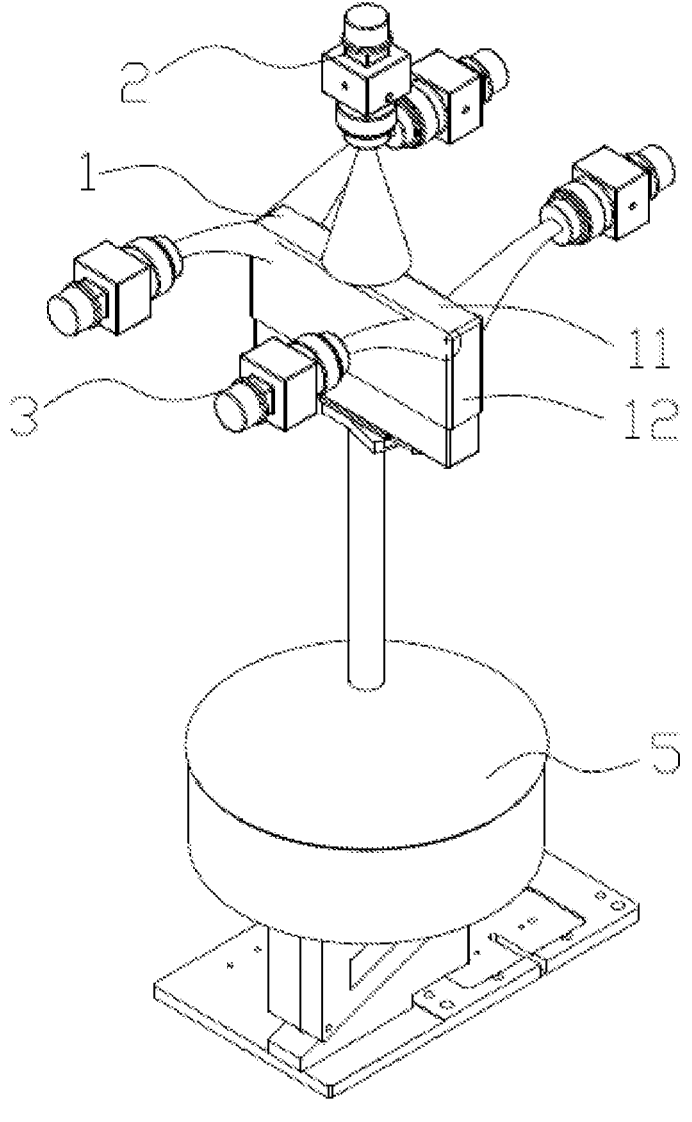
FIG. 1 is a schematic structural diagram of a flow-coating apparatus according to an embodiment of this application.

1. member to be flow-coated; 11. first surface; 12. outer peripheral surface; 121. side surface; 13. top cover plate; 131. electrode terminal;
2. first flow-coating mechanism;
3. second flow-coating mechanism; 31. flow-coating assembly;
4. delivery mechanism;
5. rotation mechanism;
6. recycling groove; 61. liquid supply mechanism; 62. accommodating tank; 63. liquid discharge pipe;
7. bearing boss; 71. bearing surface; 72. positioning groove; 73. gas channel; 74. gas orifice;
8. gas suction mechanism; and 81. flow divider.

DESCRIPTION OF EMBODIMENTS

To make the objectives, technical solutions, and advantages of the embodiments of this application clearer, the following clearly describes the technical solutions in the embodiments of this application with reference to the accompanying drawings in the embodiments of this application. Apparently, the embodiments described are some rather than all embodiments of this application. All other embodiments obtained by persons of ordinary skill in the art based on the embodiments of this application without creative efforts shall fall within the protection scope of this application.

Unless otherwise defined, all technical and scientific terms used in this application shall have the same meanings as commonly understood by those skilled in the art to which this application relates. The terms used in the specification of this application are intended to merely describe the specific embodiments rather than to limit this application. The terms "include", "comprise", and any variations thereof in the specification and claims of this application as well as the foregoing description of drawings are intended to cover non-exclusive inclusions. In the specification, claims, or accompanying drawings of this application, the terms "first", "second", and the like are intended to distinguish between different objects rather than to indicate a particular order or relative importance.

Reference to "embodiment" in this application means that specific features, structures, or characteristics described with reference to the embodiment may be included in at least one embodiment of this application. The word "embodiment" appearing in various places in the specification does not necessarily refer to the same embodiment or an independent or alternative embodiment that is exclusive of other embodiments.

In the description of this application, it should be noted that unless otherwise specified and defined explicitly, the terms "mount", "connect", "join", and "attach" should be understood in their general senses. For example, they may refer to a fixed connection, a detachable connection, or an integral connection, and may refer to a direct connection, an indirect connection via an intermediate medium, or an internal communication between two elements. Persons of ordinary skills in the art can understand specific meanings of these terms in this application as appropriate to specific situations.

The term "and/or" in this application is merely for describing an associative relationship of associated objects, indicating that three relationships may be present. For example, A and/or B may indicate three cases: presence of only A; presence of both A and B; and presence of only B. In addition, the character "/" in this application generally indicates an "or" relationship between contextually associated objects. In this disclosure, the phrases "at least one of A, B, and C" and "at least one of A, B, or C" both mean only A, only B, only C, or any combination of A, B, and C.

In the embodiments of this application, like reference signs denote like components, and for brevity, in different embodiments, detailed descriptions of like components are not repeated. It should be understood that, as shown in the accompanying drawings, sizes such as thickness, length, and width of various components and sizes such as thickness, length, and width of integrated devices in the embodiments of this application are merely for illustrative purposes and should not constitute any limitations on this application.

In this application, "multiple" means more than two (inclusive).

With advantages such as high energy density, support of cyclic charging, safety, and environment friendliness, batteries are widely used in new energy vehicles, consumer electronics, energy storage systems, and other fields. In a film application process used for batteries in conventional technologies, polyethylene terephthalate (Polyethylene terephthalate, PET) is used as a film substrate, and a pressure-sensitive adhesive is applied to the film substrate to form a film which is attached to the battery housing for insulation. Films using such film application process are low in mechanic strength, poor in puncture resistance, and prone to wear and failure, and adhesion strength between the battery housing and film layer is low, unable to meet the requirements of strong vibration condition and long-term usage.

In view of this, other coatings need to be applied to the battery housing. Typically, other coatings need to be applied to surface of the battery in different manners. Flow-coating is one of the commonly used manners. The conventional flow-coating apparatus typically performs flow-coating only on the top of an object to be flow-coated, leaving the flow-coating material to gradually spread to side surfaces of the object to be flow-coated to achieve overall coverage of the flow-coating material. However, such flow-coating method may lead to over-coating in some areas and under-coating on the side surfaces.

In view of the problem that the foregoing flow-coating apparatus cannot implement even flow-coating, an embodiment of this application provides a flow-coating apparatus, which can implement even flow-coating on the outer peripheral surface and top surface or bottom surface of a member to be flow-coated.

The battery described in the embodiments of this application is applicable to electric apparatuses, such as a mobile phone, a portable device, a laptop, an electric scooter, an electric vehicle, a steamship, a spacecraft, an electric toy, and an electric tool. For example, the spacecraft includes an airplane, a rocket, a space shuttle, and a spaceship. The electric toy includes a fixed or mobile electric toy, such as a game console, an electric vehicle toy, an electric ship toy, and an electric airplane toy. The electric tool includes an electric metal cutting tool, an electric grinding tool, an electric assembly tool, and an electric railway-specific tool, such as an electric drill, an electric grinder, an electric wrench, an electric screwdriver, an electric hammer, an electric impact drill, a concrete vibrator, and an electric planer.

Figure 2:
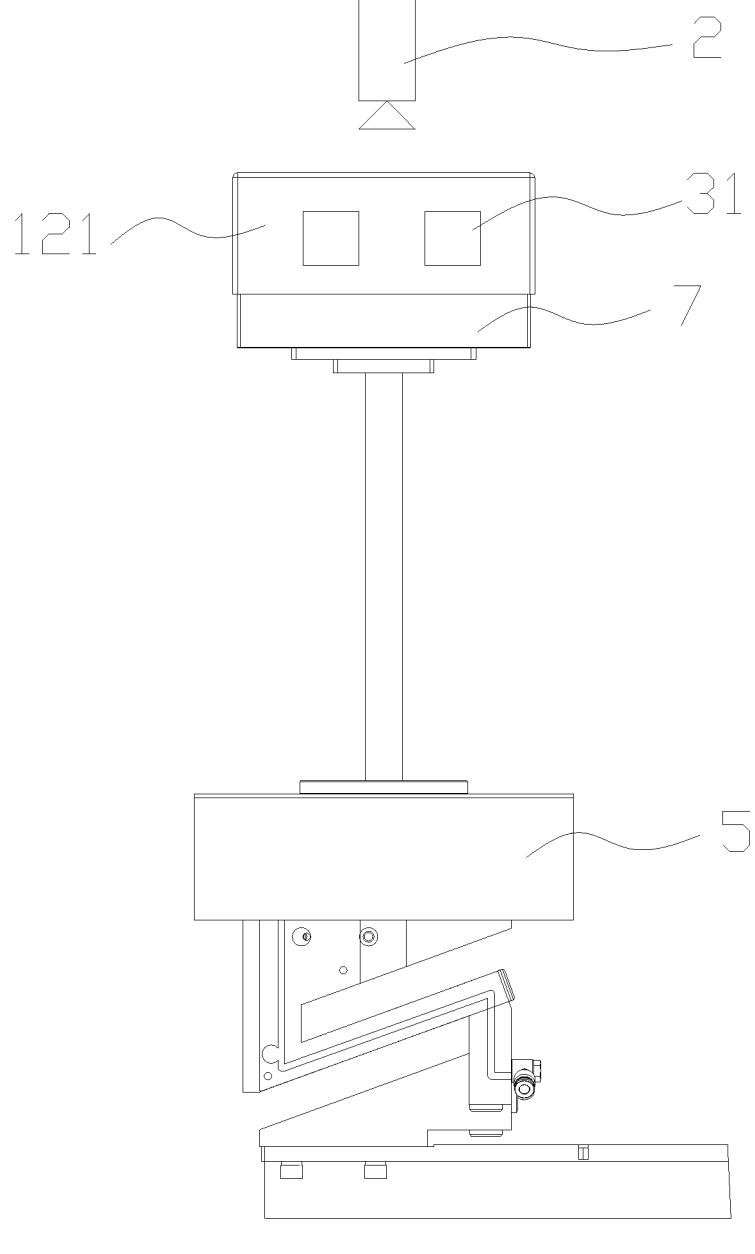
FIG. 2 is a schematic structural diagram of the flow-coating apparatus shown in FIG. 1 from another perspective.

In one aspect, referring to FIG. 1 and FIG. 2, this application provides a flow-coating apparatus configured to flow-coat a member to be flow-coated 1 with an insulation layer, where the member to be flow-coated 1 includes a first surface 11 and an outer peripheral surface 12 surrounding a periphery of the first surface 11, the first surface 11 being perpendicular to a vertical direction. The flow-coating apparatus includes a first flow-coating mechanism 2 and a second flow-coating mechanism 3, where a flow-coating opening of the first flow-coating mechanism 2 faces the first surface 11 and is configured to flow-coat the first surface 11 with the insulation layer; and a flow-coating opening of the second flow-coating mechanism 3 faces the outer peripheral surface 12 and is configured to flow-coat the outer peripheral surface 12 with the insulation layer.

It should be noted that the member to be flow-coated 1 includes but is not limited to a battery cell. The first surface 11 is a top surface or bottom surface of the member to be flow-coated 1, and the outer peripheral surface 12 surrounds the periphery of the member to be flow-coated 1 and is connected to the first surface 11 as a whole. The member to be flow-coated 1 may be of a variety of shapes: a hexahedral structure, a cylinder structure, or some other irregular shapes. This is not limited in the embodiments of this application.

The first flow-coating mechanism 2 and the second flow-coating mechanism 3 contain flow-coating materials and control the flow-coating materials to be flow-coated on different zones of the member to be flow-coated 1. A flow-coating opening of the first flow-coating mechanism 2 faces the first surface 11 for flow-coating the first surface 11 with the insulation layer; and a flow-coating opening of the second flow-coating mechanism 3 faces the outer peripheral surface 12 for flow-coating the outer peripheral surface 12 with the insulation layer. For example, the first flow-coating mechanism 2 is located on a side of the first surface 11 facing away from the member to be flow-coated 1 in the vertical direction, and the flow-coating opening of the first flow-coating mechanism 2 points to the first surface 11 in the vertical direction; the second flow-coating mechanism 3 is located on at least one side of the member to be flow-coated 1 in a horizontal direction, and the flow-coating opening of the second flow-coating mechanism 3 points to the outer peripheral surface 12 in the horizontal direction.

It can be understood that the first flow-coating mechanism 2 and the second flow-coating mechanism 3 in the embodiments of this application may perform flow-coating on the member to be flow-coated 1 at the same time, or may perform flow-coating on the member to be flow-coated 1 at different times. This is not limited in the embodiments of this application.

Optionally, the flow-coating material in the first flow-coating mechanism 2 and the second flow-coating mechanism 3 is a two-component acrylic polymer system. Compared with a conventional water-based paint system, the flow-coating material in the embodiments of this application exhibits excellent insulation performance and good mechanical performance after film forming, and is suitable for the member to be flow-coated 1 that requires high coating performance, such as battery cells.

The first flow-coating mechanism 2 and second flow-coating mechanism 3 in the embodiments of this application respectively perform flow-coating on the first surface 11 and the outer peripheral surface 12 of the member to be flow-coated 1, to ensure that the first surface 11 and the outer peripheral surface 12 are evenly flow-coated with the flow-coating material, thus ensuring even and reliable distribution of the insulation layer on the first surface 11 and outer peripheral surface 12 of the member to be flow-coated 1.

As shown in FIG. 1 and FIG. 2, in some embodiments, the outer peripheral surface 12 includes multiple pairs of side surfaces 121 disposed opposite each other, and the second flow-coating mechanism 3 includes multiple flow-coating assemblies 31, where the multiple flow-coating assemblies 31 are configured to flow-coat the multiple pairs of side surfaces 121, respectively.

In the embodiments of this application, the member to be flow-coated 1 may be a hexahedron, a cylinder, or of other shapes. That the outer peripheral surface 12 includes multiple pairs of side surfaces 121 disposed opposite each other means that the outer peripheral surface 12 includes multiple pairs of two parallel side surfaces 121, the two parallel side surfaces 121 being disposed opposite each other in the horizontal direction.

The second flow-coating mechanism 3 includes multiple flow-coating assemblies 31, and the multiple flow-coating assemblies 31 respectively correspond to multiple pairs of side surfaces 121, so as to flow-coat the multiple pairs of side surfaces 121 with the insulation layer. In other words, each pair of side surfaces 121 corresponds to at least one flow-coating assembly 31, and each flow-coating assembly 31 is configured to at least perform flow-coating on one side surface 121 of the member to be flow-coated 1. The multiple flow-coating assemblies 31 may perform flow-coating at the same time, or may perform flow-coating at different times. This is not limited in the embodiments of this application.

In the embodiments of this application, the multiple flow-coating assemblies 31 are configured to flow-coat the multiple pairs of side surfaces 121, respectively, so as to ensure that each pair of side surfaces 121 of the member to be flow-coated 1 are flow-coated with the insulation layer, thereby improving reliability of the outer surface of the member to be flow-coated 1.

In some embodiments, each side surface 121 in at least one pair of side surfaces 121 is provided with the flow-coating assembly 31 correspondingly.

Each pair of side surfaces 121 include two side surfaces 121 disposed opposite each other, and the two side surfaces 121 in at least one pair of side surfaces 121 are each provided with the flow-coating assembly 31 correspondingly, so that the flow-coating assemblies 31 can perform flow-coating on the two side surfaces 121 disposed opposite each other at the same time. For example, all side surfaces 121 are correspondingly provided with the flow-coating assemblies 31, and the flow-coating opening of the flow-coating assembly 31 points to the corresponding side surface 121 along the horizontal direction.

In the embodiments of this application, each side surface 121 in at least one pair of side surfaces 121 is provided with the flow-coating assembly 31 correspondingly. With such design, two side surfaces 121 disposed opposite each other can be flow-coated at the same time during flow-coating, thereby improving flow-coating efficiency.

As shown in FIG. 1 and FIG. 2, in some embodiments, at least one side surface 121 is provided with multiple flow-coating assemblies 31.

It can be understood that a flow-coating area of a single flow-coating assembly 31 is determined by factors such as structure and size of the flow-coating assembly 31. Therefore, for a side surface 121 with a relatively large area, a single flow-coating assembly 31 may not guarantee flow-coating for the entire side surface 121. Therefore, in the embodiments of this application, at least one side surface 121 is provided with multiple flow-coating assemblies 31, allowing the multiple flow-coating assemblies 31 to perform flow-coating on one side surface 121. This ensures that each zone of the single side surface 121 can have a structurally uniform insulation layer formed, further improving flow-coating reliability of the flow-coating apparatus.

Figure 3:
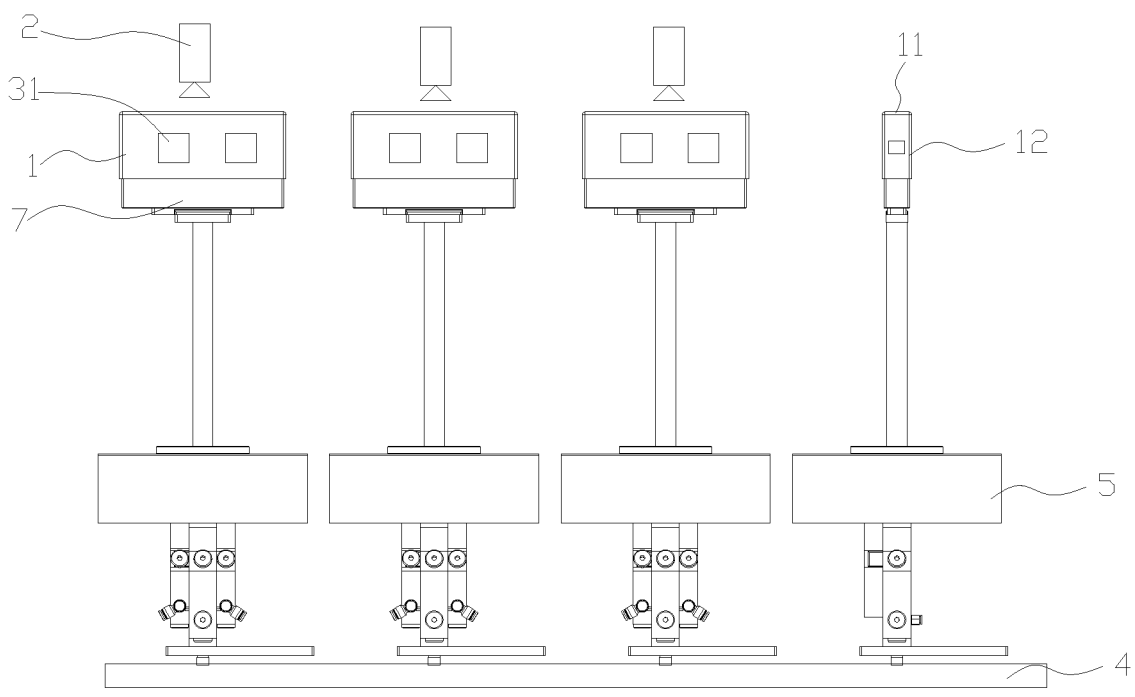
FIG. 3 is a schematic structural diagram of another flow-coating apparatus according to an embodiment of this application.

In some embodiments, referring to FIG. 3, the flow-coating apparatus further includes a delivery mechanism 4 configured to deliver multiple members 1 to be flow-coated along a delivery direction, where the multiple flow-coating assemblies 31 are spaced apart along the delivery direction, and the multiple flow-coating assemblies 31 are disposed corresponding to the multiple members 1 to be flow-coated, respectively.

The multiple members 1 to be flow-coated are disposed on one delivery mechanism 4, and the delivery mechanism 4 can drive the multiple members 1 to be flow-coated to move synchronously along the delivery direction. In addition, the multiple flow-coating assemblies 31 are spaced apart to correspond to the multiple members 1 to be flow-coated, respectively. To be specific, a distance between at least two flow-coating assemblies 31 in the delivery direction is greater than a size of the member to be flow-coated 1 in the delivery direction. Optionally, multiple first flow-coating mechanisms 2 are provided, and the multiple first flow-coating mechanisms 2 are spaced apart along the delivery direction, and the multiple first flow-coating mechanisms 2 are disposed corresponding to the multiple members 1 to be flow-coated.

The flow-coating apparatus provided in the embodiments of this application can perform flow-coating on multiple members 1 to be flow-coated at the same time through cooperation between the delivery mechanism 4 and the multiple flow-coating assemblies 31, further improving flow-coating efficiency of the flow-coating apparatus.

For example, the delivery mechanism 4 is a conveyor belt structure and is driven by an electric roller. The multiple members 1 to be flow-coated are disposed on the conveyor belt, and are driven by the electric roller to move to a position corresponding to the flow-coating assemblies 31, and then the flow-coating assemblies 31 perform flow-coating thereon to form an insulation layer. Finally, the electric roller drives a flow-coated product to leave the flow-coating apparatus.

In some embodiments, referring to FIG. 1 and FIG. 3, the flow-coating apparatus further includes a rotation mechanism 5 configured to drive rotation of the member to be flow-coated 1 to rotate, to allow the second flow-coating mechanism 3 to perform flow-coating on different zones of the outer peripheral surface 12 of the member to be flow-coated 1.

The rotation mechanism 5 is directly or indirectly connected to the member to be flow-coated 1 and is configured to drive the member to be flow-coated 1 to rotate, so that the flow-coating opening of one flow-coating assembly 31 can point to different zones of the outer peripheral surface 12 of the member to be flow-coated 1, thereby ensuring that one flow-coating assembly 31 can perform flow-coating on different zones of the outer peripheral surface 12 of the member to be flow-coated 1. Optionally, the rotation mechanism 5 is a rotation cylinder or a drive motor.

It should be noted that the delivery mechanism 4 can be used in cooperation with the rotation mechanism 5. Specifically, the delivery mechanism 4 can drive the multiple members 1 to be flow-coated to move to the position of the multiple flow-coating assemblies 31. The flow-coating assembly 31 is used to flow-coat a specific zone of the member to be flow-coated 1. The rotation mechanism 5 drives the member to be flow-coated 1 to rotate, so that different zones of the outer peripheral surface 12 of the member to be flow-coated 1 face the flow-coating assembly 31. The flow-coating assembly 31 performs flow-coating on the different zones of the outer peripheral surface 12 and repeats this operation until all zones of the outer peripheral surface 12 of the member to be flow-coated 1 are flow-coated. Finally, the delivery mechanism 4 drives the flow-coated device to leave the flow-coating apparatus.

In the embodiments of this application, the rotation mechanism 5 drives the member to be flow-coated 1 to rotate, so that the flow-coating opening of one flow-coating assembly 31 can point to different zones of the outer peripheral surface 12 of the member to be flow-coated 1. In other words, one flow-coating assembly 31 can perform flow-coating on different zones of the outer peripheral surface 12 of the member to be flow-coated 1, reducing the number of flow-coating assemblies 31 in the second flow-coating mechanism 3, and lowering manufacture costs.

Figure 4:
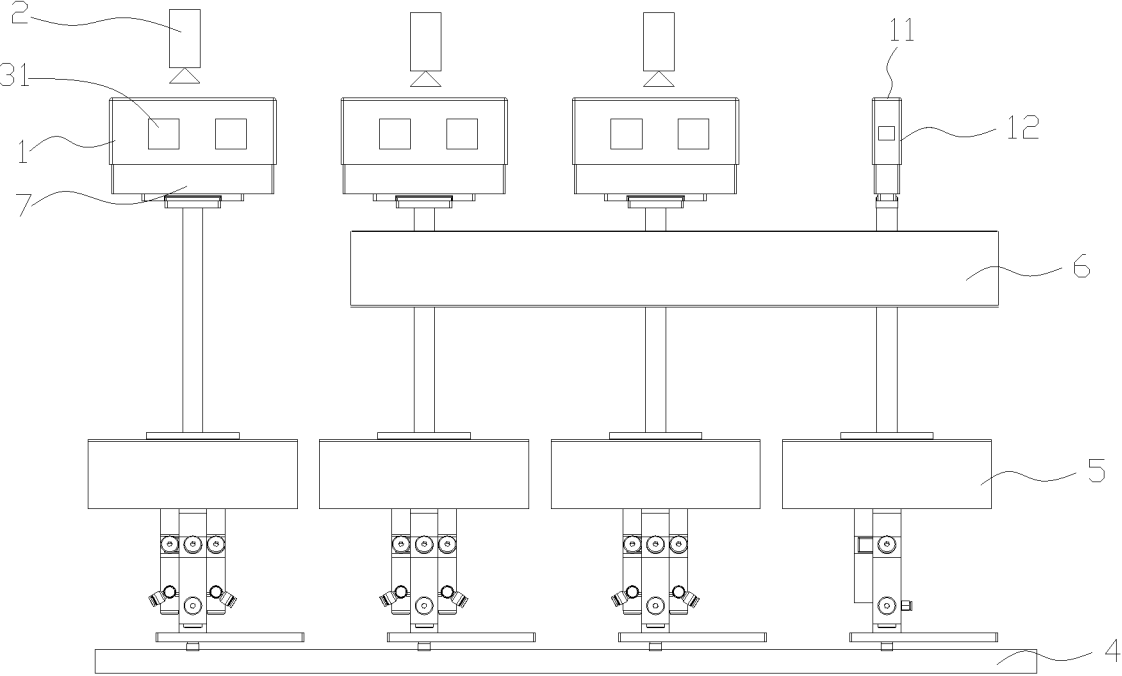
FIG. 4 is a schematic structural diagram of still another flow-coating apparatus according to an embodiment of this application.
Figure 5:
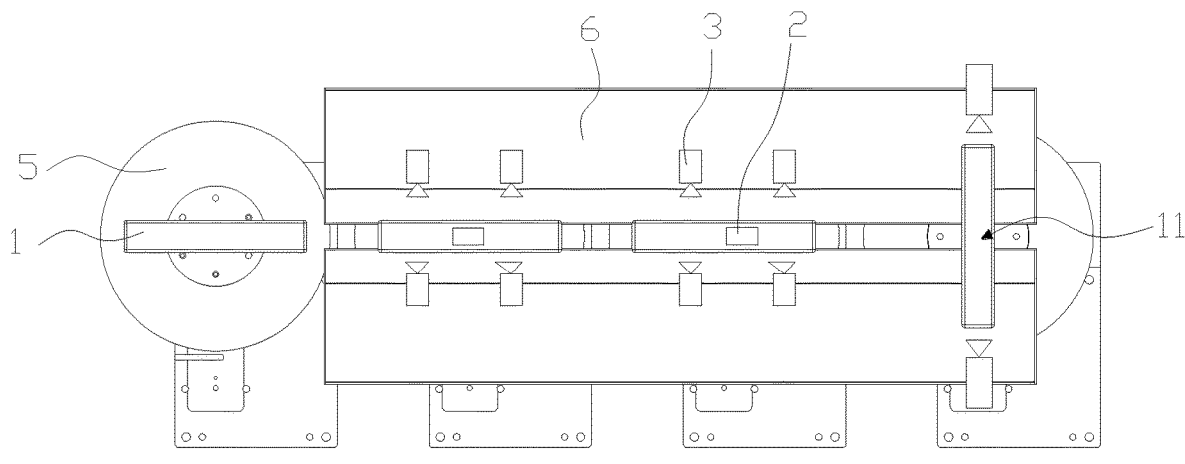
FIG. 5 is a schematic structural diagram of the flow-coating apparatus shown in FIG. 4 from another perspective.

In some embodiments, referring to FIG. 4 and FIG. 5, the flow-coating apparatus further includes a recycling groove 6, where the recycling groove 6 is located under the member to be flow-coated 1 in the vertical direction.

During flow-coating by the first flow-coating mechanism 2 and the second flow-coating mechanism 3, some flow-coating material drips from the member to be flow-coated 1, causing waste of the flow-coating material. Therefore, in order to reduce waste, in the embodiments of this application, the recycling groove 6 is provided exactly under the member to be flow-coated 1 to recycle the dripping flow-coating material. Further, the recycling groove 6 centrally recycles the flow-coating material, which facilitates subsequent processing and use of the flow-coating material. In addition, the provision of the recycling groove 6 can further prevent the flow-coating material from dripping onto the delivery mechanism 4 and the rotation mechanism 5, thereby ensuring long-term use of the delivery mechanism 4 and the rotation mechanism 5. A shape and size of the recycling groove 6 are determined based on actual usage. This is not limited in the embodiments of this application.

In the embodiments of this application, the flow-coating apparatus is provided with the recycling groove 6 for recycling dripping flow-coating material, so as to achieve reuse and reduce waste. In addition, the flow-coating material can be prevented from dripping onto the delivery mechanism 4 and the rotation mechanism 5, ensuring their long-term use.

Figure 6:
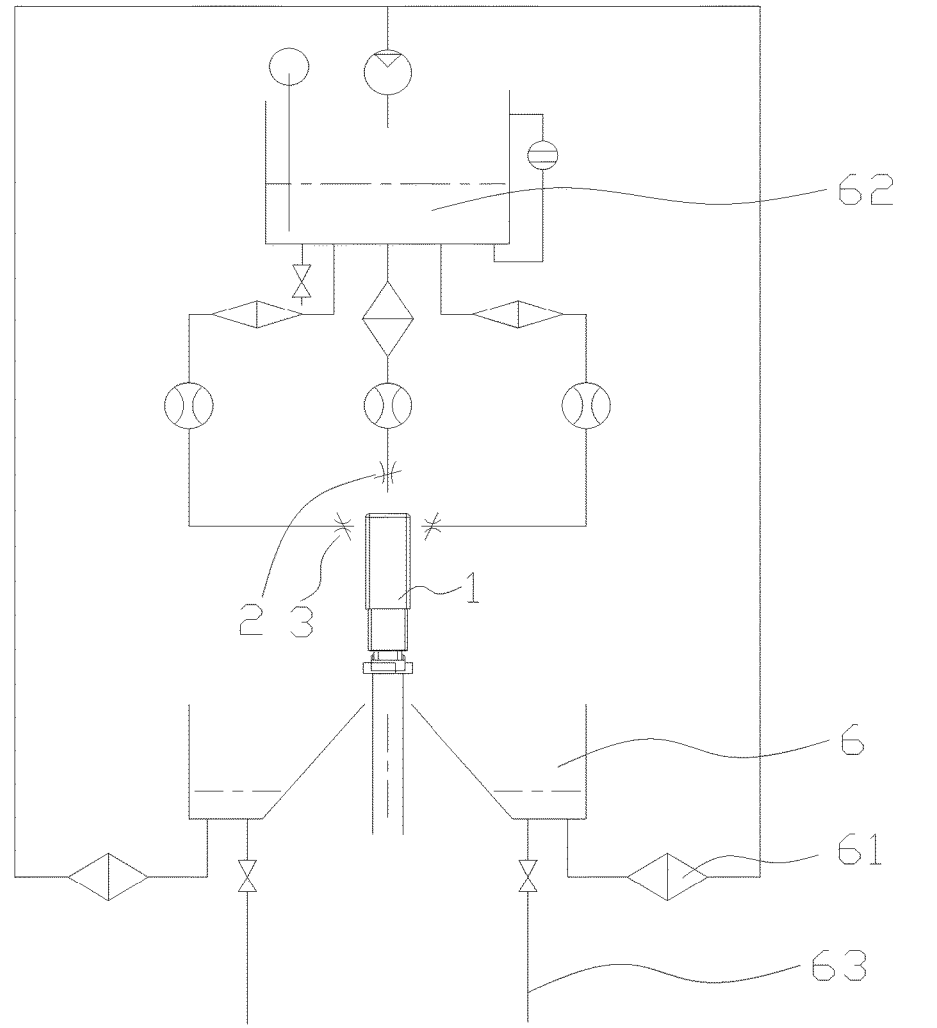
FIG. 6 is a schematic diagram of a hydraulic pipeline in a flow-coating apparatus according to an embodiment of this application.

In some embodiments, referring to FIG. 6, the flow-coating apparatus further includes a liquid supply mechanism 61, where at least one of the first flow-coating mechanism 2 and the second flow-coating mechanism 3 communicates with the recycling groove 6 via the liquid supply mechanism 61.

The liquid supply mechanism 61 is configured to bring at least one of the first flow-coating mechanism 2 and the second flow-coating mechanism 3 into communication with the recycling groove 6. For example, the first flow-coating mechanism 2 and the second flow-coating mechanism 3 both communicate with the recycling groove 6 via the liquid supply mechanism 61. When the flow-coating material dripping into the recycling groove 6 has accumulated to a certain weight, the liquid supply mechanism 61 can be manually or automatically controlled to operate, so that the flow-coating material in the recycling groove 6 can be transported into the first flow-coating mechanism 2 and the second flow-coating mechanism 3, thereby achieving reuse of the flow-coating material. Optionally, the liquid supply mechanism 61 may be a hydraulic pump and is connected to the first flow-coating mechanism 2, the second flow-coating mechanism 3, and the recycling groove 6 via pipes.

In some optional embodiments, the flow-coating apparatus further includes an accommodating tank 62 for accommodating the flow-coating material. The accommodating tank 62 directly communicates with at least one of the first flow-coating mechanism 2 and the second flow-coating mechanism 3. The first flow-coating mechanism 2 and the second flow-coating mechanism 3 are each provided with an adjustable traffic valve for controlling a flow-coating velocity. Related persons can directly inject the flow-coating material into the accommodating tank 62, and the flow-coating material in the accommodating tank 62 is applied onto the member to be flow-coated 1 via the first flow-coating mechanism 2 and the second flow-coating mechanism 3. In addition, the accommodating tank 62 further communicates with the recycling groove 6 via the liquid supply mechanism 61. The dripping flow-coating material recycled by the recycling groove 6 first reaches the accommodating tank 62, then reaches the first flow-coating mechanism 2 and the second flow-coating mechanism 3, and is applied onto the member to be flow-coated 1, thereby achieving reuse.

In some optional embodiments, the flow-coating apparatus further includes a liquid discharge pipe 63 and a control valve provided on the liquid discharge pipe 63. The liquid discharge pipe 63 is provided on the accommodating tank 62 and the recycling groove 6. When the flow-coating finishes, redundant flow-coating material is discharged through the liquid discharge pipe 63 from the accommodating tank 62 and the recycling groove 6. The control valve is configured to control the liquid discharge pipe 63 to connect to or disconnect from the accommodating tank 62 and the recycling groove 6. It can be understood that in the embodiments of this application, a filter, a liquid level meter, a flowmeter, and the like may be further included. This is not limited in the embodiments of this application.

The recycling groove 6 in the embodiments of this application communicates with the first flow-coating mechanism 2 and the second flow-coating mechanism 3 via the liquid supply mechanism 61, so that the flow-coating material can be recycled through manual or automatic control. This improves working efficiency of the flow-coating apparatus while improving utilization of the flow-coating material.

Figure 7:
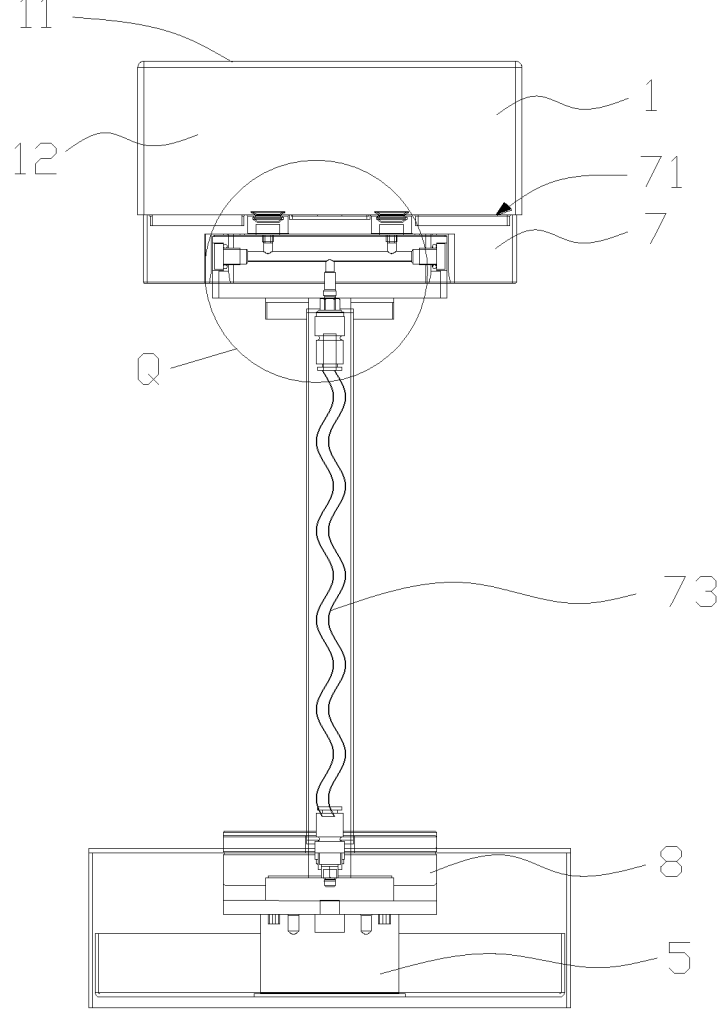
FIG. 7 is a schematic perspective structural diagram of yet another flow-coating apparatus according to an embodiment of this application.

In some embodiments, referring to FIG. 7 and FIG. 8, the flow-coating apparatus further includes a bearing boss 7, where the bearing boss 7 includes a bearing surface 71 and a positioning groove 72 formed by the bearing surface 71 being recessed inwards, and the member to be flow-coated 1 is placed on the bearing boss 7 via the positioning groove 72.

The bearing boss 7 is configured to bear the member to be flow-coated 1, and the bearing surface 71 of the bearing boss 7 is configured for direct contact with the member to be flow-coated 1. The positioning groove 72 is provided on the bearing surface 71 and is formed by inward recess, and the positioning groove 72 is used for positioning the member to be flow-coated 1 on the bearing boss 7. Optionally, the bearing boss 7 is directly or indirectly connected to the rotation mechanism 5, and the rotation mechanism 5 drives the bearing boss 7 and the member to be flow-coated 1 to rotate synchronously. A shape of the positioning groove 72 matches a shape of surface of the member to be flow-coated 1. This is not limited in the embodiments of this application.

In the embodiments of this application, the positioning groove 72 is provided on the bearing surface 71, to implement positioning of the member to be flow-coated 1 on the bearing boss 7, so as to prevent the member to be flow-coated 1 from leaving the bearing boss 7 under stress during the flow-coating process, thereby ensuring overall structural reliability of the flow-coating apparatus.

In some embodiments, the flow-coating apparatus further includes a gas suction mechanism 8, and the bearing boss 7 includes a gas channel 73 communicating with the gas suction mechanism 8, where the gas channel 73 includes a gas orifice 74 provided on the bearing surface 71, and the gas suction mechanism 8 attracts the member to be flow-coated 1 onto the bearing surface 71 via the gas orifice 74.

The gas suction mechanism 8 can evacuate gas and create a vacuum in a specific space. For example, the gas suction mechanism 8 includes a vacuum pump, where the vacuum pump communicates with the gas channel 73, and one end of the gas channel 73 is connected to the gas orifice 74. During usage, the member to be flow-coated 1 is placed on the bearing boss 7 via the positioning groove 72, and the vacuum pump runs to suck out air in the gas channel 73. Under an effect of pressure, the member to be flow-coated 1 is fittedly attracted to the bearing surface 71 of the bearing boss 7, achieving mutual fixation between them.

Optionally, the gas suction mechanism 8 further includes a flow divider 81, where the flow divider 81 includes a main pipe and multiple branch flow division pipes. The main pipe has one end communicating with the gas channel 73, and another end communicating with the multiple branch flow division pipes, where the multiple branch flow division pipes communicate with the multiple gas orifices 74, respectively. The gas suction mechanism 8 communicates with the bearing surface 71 via the gas channel 73 and the flow divider 81, allowing different positions of the member to be flow-coated 1 to be fixedly connected to the bearing boss 7, thereby further improving connection reliability.

In the embodiments of this application, the fixed connection between the member to be flow-coated 1 and the bearing boss 7 is implemented via the gas suction mechanism 8, which further improves connection reliability between the bearing boss 7 and the member to be flow-coated 1, preventing the member to be flow-coated 1 from leaving the bearing boss 7 under external forces. In addition, the gas suction mechanism 8 needs no direct contact with the member to be flow-coated 1, preventing scratches on the outer surface of the member to be flow-coated 1.

In some embodiments, as shown in FIG. 7 and FIG. 8, the member to be flow-coated 1 is a battery cell, where the battery cell includes a housing and a top cover plate 13. The top cover plate 13 is disposed on one side of the housing and covers the opening of the housing, and the housing includes a bottom wall opposite the top cover plate 13 and a side wall surrounding a periphery of the bottom wall, where a side of the bottom wall facing away from the top cover plate 13 is the first surface 11, and a side of the side wall facing away from the opening is the outer peripheral surface 12.

The housing is a hollow structure with an opening, the top cover plate 13 is disposed on the housing and covers the opening, an electrode terminal 131 is disposed on the top cover plate 13, and the electrode assembly is disposed in the housing and is electrically connected to the electrode terminal 131. The top cover plate 13 of the battery cell is in direct contact with the bearing surface 71 of the bearing boss 7.

The housing may be in a hexahedral shape or other shapes. An accommodating space is formed inside the housing to accommodate the electrode assembly and electrolyte. The housing has an opening formed at one end, and the electrode assembly can be placed into the accommodating space through the opening. The housing may be made of a conductive metal material. Optionally, the housing is made of aluminum or aluminum alloy.

The electrode assembly is disposed inside the housing and functions as a core member for implementing charging and discharging of the battery cell. Structurally, the electrode assembly includes a positive electrode plate, a negative electrode plate, and a separator that separates the positive electrode plate and the negative electrode plate. In some embodiments, the positive electrode plate, the separator, and the negative electrode plate are stacked in sequence and wound as one. In some other embodiments, the positive electrode plate and the negative electrode plate are both of a sheet-like structure and are stacked alternately in a thickness direction.

The electrode terminal 131 is on a side of the battery cell in a height direction of the battery cell and is electrically connected with the electrode assembly to implement the charging and discharging of the electrode assembly. In the embodiments of this application, the top cover plate 13 is fixedly connected to the bearing boss 7, and flow-coating is performed on the bottom wall. In other words, the battery cell is fastened upside down on the bearing boss 7 for flow-coating. With such design, the electrode terminal 131 in the battery cell can be prevented from being polluted by the flow-coating material, improving production yield of battery cells. Optionally, the positioning groove 72 on the bearing boss 7 is disposed corresponding to the electrode terminal 131, so as to implement positioning of the battery cell on the bearing boss 7.

According to a second aspect, the embodiments of this application provides a flow-coating method used for flow-coating a member to be flow-coated, where the member to be flow-coated includes a first surface and an outer peripheral surface surrounding a periphery of the first surface, the first surface being perpendicular to a vertical direction. Referring to FIG. 9, the flow-coating method includes the following steps.

S100. Provide a first flow-coating mechanism and a second flow-coating mechanism, where a flow-coating opening of the first flow-coating mechanism faces the first surface, and a flow-coating opening of the second flow-coating mechanism faces the outer peripheral surface.

S110. Perform flow-coating on the first surface and the outer peripheral surface using the first flow-coating mechanism and the second flow-coating mechanism.

In step S100, the first flow-coating mechanism and the second flow-coating mechanism contain flow-coating materials and control the flow-coating materials to be applied to different zones of the member to be flow-coated. A flow-coating opening of the first flow-coating mechanism faces the first surface, and a flow-coating opening of the second flow-coating mechanism faces the outer peripheral surface. For example, the first flow-coating mechanism is located on a side of the first surface facing away from the member to be flow-coated in the vertical direction, and the flow-coating opening of the first flow-coating mechanism points to the first surface in the vertical direction. The second flow-coating mechanism is located on at least one side of the member to be flow-coated in a horizontal direction, and the flow-coating opening of the second flow-coating mechanism points to the outer peripheral surface in the horizontal direction.

In step S110, the first flow-coating mechanism performs flow-coating on the first surface to form an insulation layer on the first surface, and the second flow-coating mechanism performs flow-coating on the outer peripheral surface to form an insulation layer on the outer peripheral surface. The first flow-coating mechanism and the second flow-coating mechanism may perform flow-coating at the same time, or may perform flow-coating at different times. This is not limited in the embodiments of this application.

In some embodiments, in step S110, the first flow-coating mechanism and the second flow-coating mechanism perform flow-coating on the first surface and the outer peripheral surface at the same time. The first flow-coating mechanism and second flow-coating mechanism in the embodiments of this application perform flow-coating on the first surface and the outer peripheral surface at the same time, thereby improving flow-coating efficiency of the flow-coating apparatus.

Figure 10:
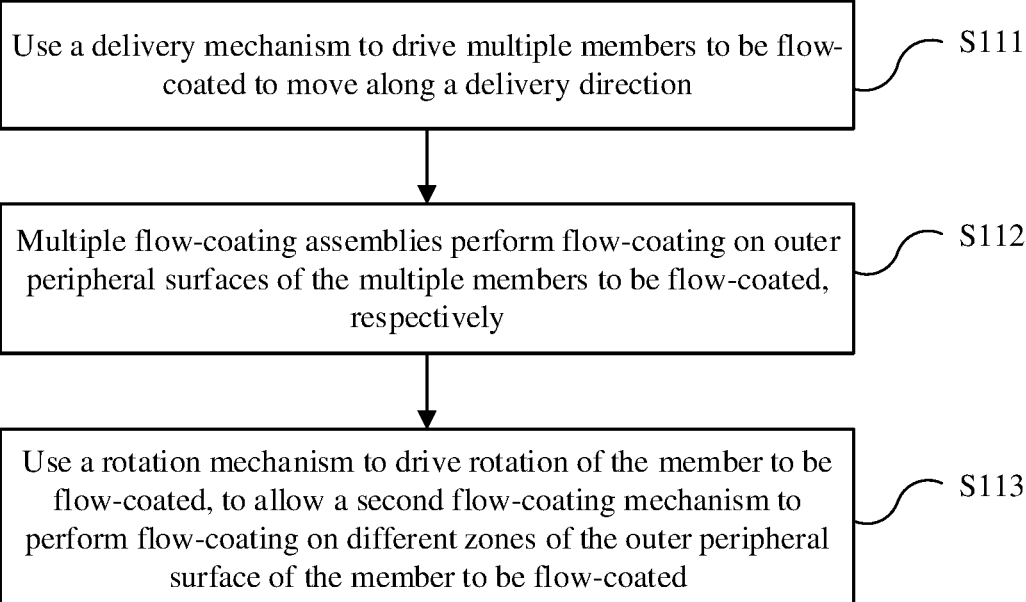
FIG. 10 is a flowchart of another flow-coating method according to an embodiment of this application.

In some embodiments, the second flow-coating mechanism includes multiple flow-coating assemblies spaced apart. Referring to FIG. 10, the step S110 includes:

S111. Use a delivery mechanism to drive multiple members to be flow-coated to move along a delivery direction.

S112. The multiple flow-coating assemblies perform flow-coating on the outer peripheral surfaces of the multiple members to be flow-coated, respectively.

In step S111, the multiple members to be flow-coated are disposed on one delivery mechanism, and the delivery mechanism can drive the multiple members to be flow-coated to move synchronously along the delivery direction. The multiple flow-coating assemblies are spaced apart to correspond to the multiple members to be flow-coated, respectively.

In step S112, the multiple flow-coating assemblies perform flow-coating on outer peripheral surfaces of different members to be flow-coated, respectively, so as to perform flow-coating on multiple members to be flow-coated at the same time, further improving flow-coating efficiency of the flow-coating apparatus. Optionally, multiple first flow-coating mechanisms are provided, and the multiple first flow-coating mechanisms 2 are spaced apart along the delivery direction, and the multiple first flow-coating mechanisms are disposed corresponding to the multiple members to be flow-coated.

As shown in FIG. 10, in some embodiments, the step S110 includes:

S113. Use a rotation mechanism to drive rotation of the member to be flow-coated, to allow the second flow-coating mechanism to perform flow-coating on different zones of the outer peripheral surface of the member to be flow-coated.

The rotation mechanism 5 is directly or indirectly connected to the member to be flow-coated 1 and is configured to drive the member to be flow-coated 1 to rotate, so that the flow-coating opening of one flow-coating assembly 31 can point to different zones of the outer peripheral surface 12 of the member to be flow-coated 1, thereby ensuring that one flow-coating assembly 31 can perform flow-coating on different zones of the outer peripheral surface 12 of the member to be flow-coated 1.

As shown in FIG. 9, in some embodiments, the flow-coating method further includes:

S120. Perform drying on a flow-coated device, where a drying temperature is 40° C. to 100° C., and a drying time is 1 min to 15 min.

In step S120, the flow-coated device is dried so that the insulation layer on surface can be entirely cured, thereby ensuring that the finally formed insulation layer is structurally stable.

In conclusion, it should be noted that the foregoing embodiments are for description of the technical solutions of this application only rather than for limiting this application. Although this application has been described in detail with reference to the foregoing embodiments, persons of ordinary skill in the art should appreciate that they can still make modifications to the technical solutions described in the embodiments or make equivalent replacements to some or all technical features thereof without departing from the scope of the technical solutions of the embodiments of this application. All such modifications and equivalent replacements shall fall within the scope of claims and specification of this application. In particular, as long as there is no structural conflict, the various technical features mentioned in the embodiments can be combined in any manner. This application is not limited to the specific embodiments disclosed in this specification but includes all technical solutions falling within the scope of the claims.

What is claimed is:

1. A flow-coating apparatus, configured to flow-coat a member to be flow-coated with an insulation layer, wherein the member to be flow-coated comprises a first surface and an outer peripheral surface surrounding a periphery of the first surface perpendicular to a vertical direction, the flow-coating apparatus comprising:

a first flow-coating mechanism, wherein a flow-coating opening of the first flow-coating mechanism faces the first surface and is configured to flow-coat the first surface with the insulation layer;

a second flow-coating mechanism, wherein a flow-coating opening of the second flow-coating mechanism faces the outer peripheral surface and is configured to flow-coat the outer peripheral surface with the insulation layer;

a rotation mechanism comprising a rotation cylinder or a drive motor, and configured to drive the member to be flow-coated to rotate around a central axis;

a recycling groove located under the member to be flow-coated in the vertical direction and above the rotation mechanism in the vertical direction;

a liquid supply mechanism comprising a hydraulic pump, wherein at least one of the first flow-coating mechanism or the second flow-coating mechanism communicates with the recycling groove via the hydraulic pump; and a gas suction mechanism located above the rotation mechanism in the vertical direction.

2. The flow-coating apparatus according to claim 1, wherein the outer peripheral surface comprises multiple pairs of side surfaces disposed opposite each other, and the second flow-coating mechanism comprises multiple flow-coating assemblies, wherein the multiple flow-coating assemblies are configured to flow-coat the multiple pairs of side surfaces, respectively.

3. The flow-coating apparatus according to claim 2, wherein each side surface in at least one pair of side surfaces is correspondingly provided with a flow-coating assembly of the multiple flow-coating assemblies.

4. The flow-coating apparatus according to claim 2, wherein at least one side surface is correspondingly provided with multiple flow-coating assemblies.

5. The flow-coating apparatus according to claim 2, further comprising:

a delivery mechanism configured to deliver multiple members to be flow-coated along a delivery direction;

wherein the multiple flow-coating assemblies are spaced apart along the delivery direction, and the multiple flow-coating assemblies are disposed corresponding to the multiple members to be flow-coated, respectively.

6. The flow-coating apparatus according to claim 1, further comprising:

a bearing boss, wherein the bearing boss comprises a bearing surface and a positioning groove formed by the bearing surface being recessed inwards, the member to be flow-coated being placed on the bearing boss via the positioning groove.

7. The flow-coating apparatus according to claim 6, wherein the bearing boss further comprises a gas channel communicating with the gas suction mechanism, the gas channel comprises a gas orifice provided on the bearing surface, and the gas suction mechanism attracts the member to be flow-coated onto the bearing surface via the gas orifice.

8. The flow-coating apparatus according to claim 1, wherein:

the member to be flow-coated is a battery cell, wherein the battery cell comprises a housing and a top cover plate, the top cover plate is disposed at one side of the housing and covers an opening of the housing, and the housing comprises a bottom wall opposite the top cover plate and a side wall surrounding a periphery of the bottom wall; and wherein a side of the bottom wall facing away from the top cover plate is the first surface, and a side of the side wall facing away from the opening is the outer peripheral surface.

9. The flow-coating apparatus according to claim 1, further comprising:

a delivery mechanism configured to deliver the member to be flow-coated along a delivery direction;

wherein the recycling groove is located above the delivery mechanism in the vertical direction.

10. The flow-coating apparatus according to claim 1, further comprising:

a bearing boss located above the rotation mechanism in the vertical direction, and comprising a bearing surface and a gas channel communicating with the gas suction mechanism, the gas channel being located between the rotation mechanism and the bearing surface in the vertical direction.

11. A flow-coating method for flow-coating a member to be flow-coated performed by the flow-coating apparatus according to claim 1, wherein the member to be flow-coated comprises a first surface and an outer peripheral surface surrounding a periphery of the first surface perpendicular to a vertical direction, the flow-coating method comprising:

providing the first flow-coating mechanism and the second flow-coating mechanism; and performing flow-coating on the first surface and the outer peripheral surface using the first flow-coating mechanism and the second flow-coating mechanism.

12. The flow-coating method according to claim 11, wherein performing flow-coating on the first surface and the outer peripheral surface using the first flow-coating mechanism and the second flow-coating mechanism includes the first flow-coating mechanism and the second flow-coating mechanism performing flow-coating on the first surface and the outer peripheral surface at the same time.

13. The flow-coating method according to claim 11, wherein:

the second flow-coating mechanism comprises multiple flow-coating assemblies spaced apart; and performing flow-coating on the first surface and the outer peripheral surface using the first flow-coating mechanism and the second flow-coating mechanism comprises:

using a delivery mechanism to drive multiple members to be flow-coated to move along a delivery direction; and performing, by the multiple flow-coating assemblies, flow-coating on the outer peripheral surfaces of the multiple members to be flow-coated, respectively.

14. The flow-coating method according to claim 11, wherein performing flow-coating on the first surface and the outer peripheral surface using the first flow-coating mechanism and the second flow-coating mechanism comprises:

using the rotation mechanism to drive rotation of the member to be flow-coated, to allow the second flow-coating mechanism to perform flow-coating on different zones of the outer peripheral surface of the member to be flow-coated.

15. The flow-coating method according to claim 11, further comprising:

performing drying on a flow-coated device, wherein a drying temperature is 40° C. to 100° C., and a drying time is 1 min to 15 min.

\* \* \* \* \*